United States Patent [19]
Scholtens et al.

[11] 3,949,861
[45] Apr. 13, 1976

[54] PACKAGING WEIGHTED GROUPS OF ARTICLES

[75] Inventors: Simon A. Scholtens; Albert Scholtens, both of Grant, Mich.

[73] Assignee: Nu-Way Marketing and Packaging Co., Inc., Grant, Mich.

[22] Filed: Sept. 18, 1974

[21] Appl. No.: 506,979

Related U.S. Application Data

[63] Continuation-in-part of Ser. No. 309,146, Nov. 24, 1972.

[52] U.S. Cl. .................................... 198/39; 198/56
[51] Int. Cl.² ........................................ B65G 69/00
[58] Field of Search ................. 198/39, 56; 177/120

[56] References Cited
UNITED STATES PATENTS

| | | | |
|---|---|---|---|
| 2,698,692 | 1/1955 | Jones et al. ....................... | 198/56 X |
| 3,073,402 | 1/1963 | Green et al. ...................... | 198/39 X |

FOREIGN PATENTS OR APPLICATIONS

| | | | |
|---|---|---|---|
| 687,454 | 4/1962 | Canada ............................... | 177/122 |

*Primary Examiner*—James B. Marbert
*Attorney, Agent, or Firm*—McGarry & Waters

[57] ABSTRACT

An apparatus for feeding substantially equally weighted groups of articles to a packaging apparatus in a timed continuous sequence. The articles are initially fed individually to a plurality of hoppers, each of which has means to weigh the articles therein. Further feeding of articles to any given hopper is blocked or discontinued when a predetermined weight of the articles has been reached in the particular hopper. A conveyor having a plurality of containers passes beneath the hoppers to receive the articles therefrom as they are dumped from the hoppers. The dumping of the articles from the hopper is controlled with the movement of the containers beneath the hoppers so that each hopper dumps the articles only in empty containers. The control means prevents more than one group of articles from being dumped into any given container on the conveyor and ensures that each container on the conveyor is filled so that the packaging operation has a continuous supply of the groups of articles.

Means are provided to prevent dumping of a hopper in the event that the hopper fills after the conveyor has stopped for the dumping cycle. An electric eye is provided to sense the presence of an empty container beneath multiple weigh hoppers and means are provided for latching the dumping mechanism after commencement of dumping to prevent premature termination of the dumping due to detection of the articles falling into the container during dumping of the hoppers.

8 Claims, 6 Drawing Figures

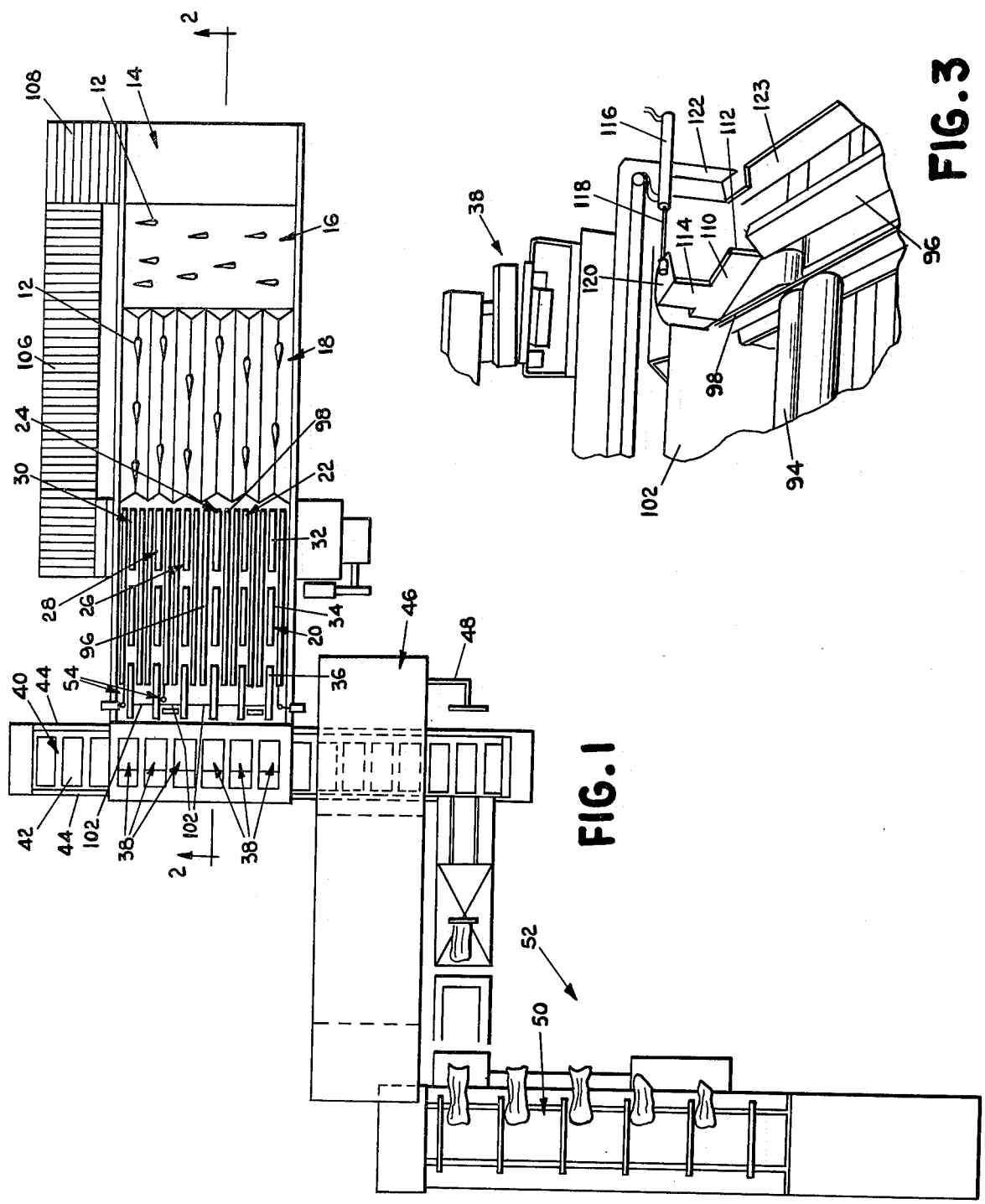

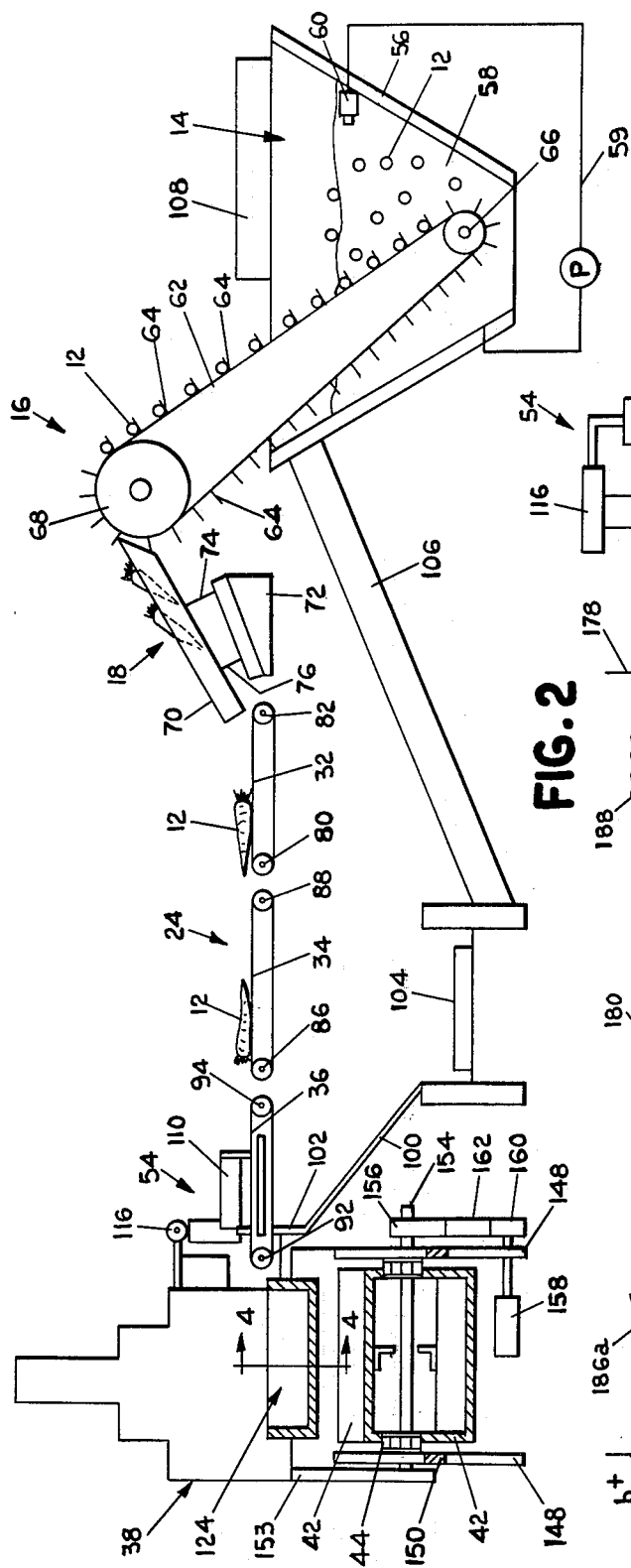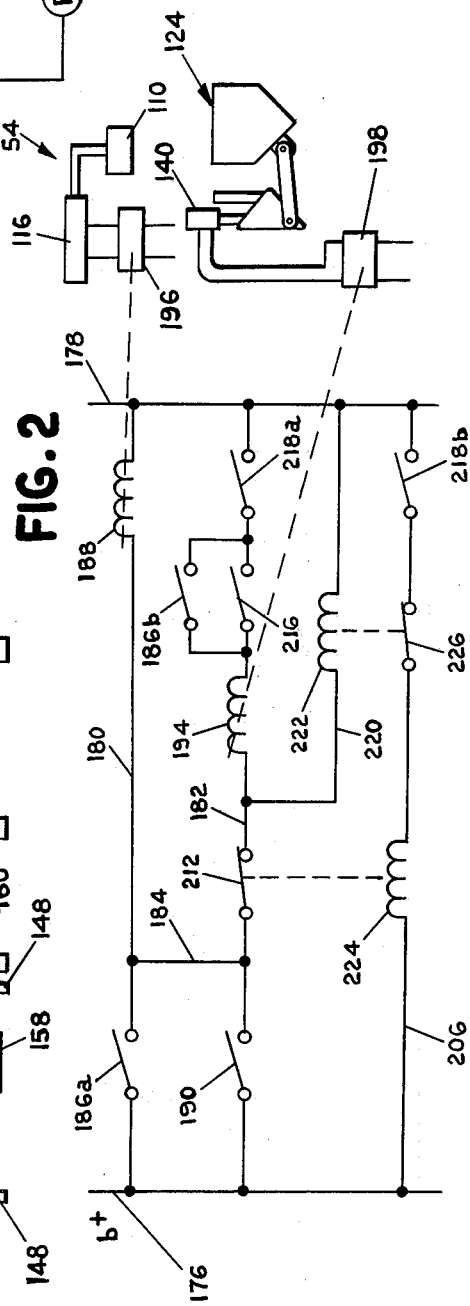

PACKAGING WEIGHTED GROUPS OF ARTICLES

CROSS-REFERENCE TO RELATED APPLICATION

This application is a continuation-in-part of co-pending Ser. No. 309,146 filed Nov. 24, 1972.

BACKGROUND OF THE INVENTION

1. Field of the Invention

This invention relates to feeding groups of articles. In one of its aspects, the invention relates to an improved system for filling containers with predetermined articles to preclude dumping incomplete groups of articles into the containers.

2. State of the Prior Art

Produce, such as carrots, are commonly sold in bags which contain a predetermined weight of the produce. For example, carrots are commonly sold in one pound plastic bags. The bagging of produce in one pound bags creates certain efficiencies in a supermarket but requires the wholesaler to package his products.

Weighing and bagging the produce is tedious, time consuming and costly for the wholesaler. Machines are presently available for bagging the produce when the produce can be fed in weighted quantities in a timed sequence to the bagging apparatus. An example of such a machine is the Formost Produce Bagger manufactured by Formost Packaging Machines, Inc., Seattle, Wash. However, weighing of the product by hand labor and feeding the same to a conveyor for the bagging operation is also tedious, time consuming and costly.

It has been proposed to use a weighing machine which could weigh the product until a desired weight is obtained and then dump the same into containers on a conveyor for feeding through the packaging machine. However, difficulty is encountered in keeping up with the packaging machine when a single weigh hopper is used. When plural weigh hoppers are used, difficulties are encountered in dropping more than one load of produce into a given container and in having some containers on the conveyor without any product.

In U.S. Pat. No. 2,698,692 to Jones, et al., there is disclosed a system for feeding articles to a plurality of retainers on a conveyor which is moved beneath a plurality of separate stacking means. Each of the stacking means collects a predetermined number of articles in a given stack and thereafter moves the stack of articles into one of two storage compartments. The articles are dropped from the storage compartment in synchronized movement with preselected containers on the conveyor. Positioning cams extending from the bottom of the conveyor which is beneath the storage compartments and actuate release of a stack of articles from a given storage compartment into a particular conveyor retainer.

U.S. Pat. No. 3,807,123 to Kihnke discloses a system for filling bags with a predetermined weight of articles, such as carrots, by feeding the articles seriatim to a weighing means and thereafter dumping the articles into the bag after a predetermined weight has been received in the weighing means. A gate extends across the path of articles fed to the weighing means as soon as a predetermined weight has been received therein.

In copending U.S. Patent Application Ser. No. 309,146, there is disclosed and claimed an article feeding apparatus wherein articles fed through a plurality of weighing hoppers are discharged into empty containers which pass therebeneath. In the disclosed embodiment, the hoppers dump in only preselected containers. In this system, occasionally hoppers will not be filled and the timing of the conveyor with the feed mechanism is such that the conveyor does not move at an optimum speed. Further, occasionally, a particular hopper will fill after the conveyor has stopped beneath the hopper and the hopper will thereafter discharge into the container. However, on occasion, sufficient time does not exist to complete the dump cycle which results in spilling of the articles and/or premature closing of the hoppers.

It has been suggested to put a photocell on the end hopper in the series to sense the presence of an empty container and to dump the hopper if the container is empty. However, if the photocell sees the article dumping in the hopper, it tends to cause the photocell operated switch to open and thereby prematurely terminate dumping of the hopper.

SUMMARY OF THE INVENTION

In accordance with the invention, there is provided an apparatus for feeding groups of articles to a packaging operation in a timed continuous sequence wherein each of the groups of articles have a minimum weight. The apparatus has a plurality of weighing means, each of the weighing means including a weigh hopper for holding a plurality of articles, means for weighing articles in the weigh hopper and means to dump articles from the weigh hopper. The weigh hoppers are aligned in a row along a predetermined path beneath which a conveyor moves with a plurality of containers adapted to hold and receive a quantity of the articles. Means are provided for feeding the articles seriatim to each of the weighing means to accumulate a minimal weight of the articles in the weigh hopper and means are provided for blocking further feeding of the articles to the weighing means after a minimum weight of the articles is present in each of the weigh hoppers. The conveyor is intermittently driven beneath the weigh hoppers. Means are provided for controlling each of the dumping means of the weighing means to dump articles in each of the weight hoppers only in an empty container so that only one group of articles is dumped into each of the containers and means are provided to prevent operation of the dumping means in a given hopper which has not attained the predetermined weight of the articles at the time that the conveyor stops. Further, a photocell is positioned beneath at least one hopper and preferably beneath all but the first hopper in the series to sense the presence of an empty container therebeneath. Means are provided to actuate dumping of the hopper, if full, responsive to sensing of the empty container. Further, means are provided to prevent premature termination of the dumping of the hopper due to the detection of an article falling into the container beneath the one weigh hopper at the commencement of the dumping operation.

The control means desirably includes a circuit having a switch means operated by the weighing means to close when the weight of the article reaches a predetermined minimum, a first actuating means in the circuit in series with the first switch to operate the dumping means when the current flows therethrough and a second switch means in the circuit in series with the first switch and the first actuating means, the second switch adapted to close when an empty container is beneath a given weigh hopper.

BRIEF DESCRIPTION OF THE DRAWINGS

The invention will now be described with reference to the accompanying drawings in which:

FIG. 1 is a plan view of an apparatus for feeding and bagging articles such as carrots according to the invention;

FIG. 2 is a sectional view seen along lines 2—2 of FIG. 1;

FIG. 3 is an enlarged perspective view of a portion of the apparatus illustrating a diverter mechanism;

FIG. 6 is a schematic view of a portion of the electrical control system according to the invention.

DETAILED DESCRIPTION OF THE PREFERRED EMBODIMENT

Figure 5:
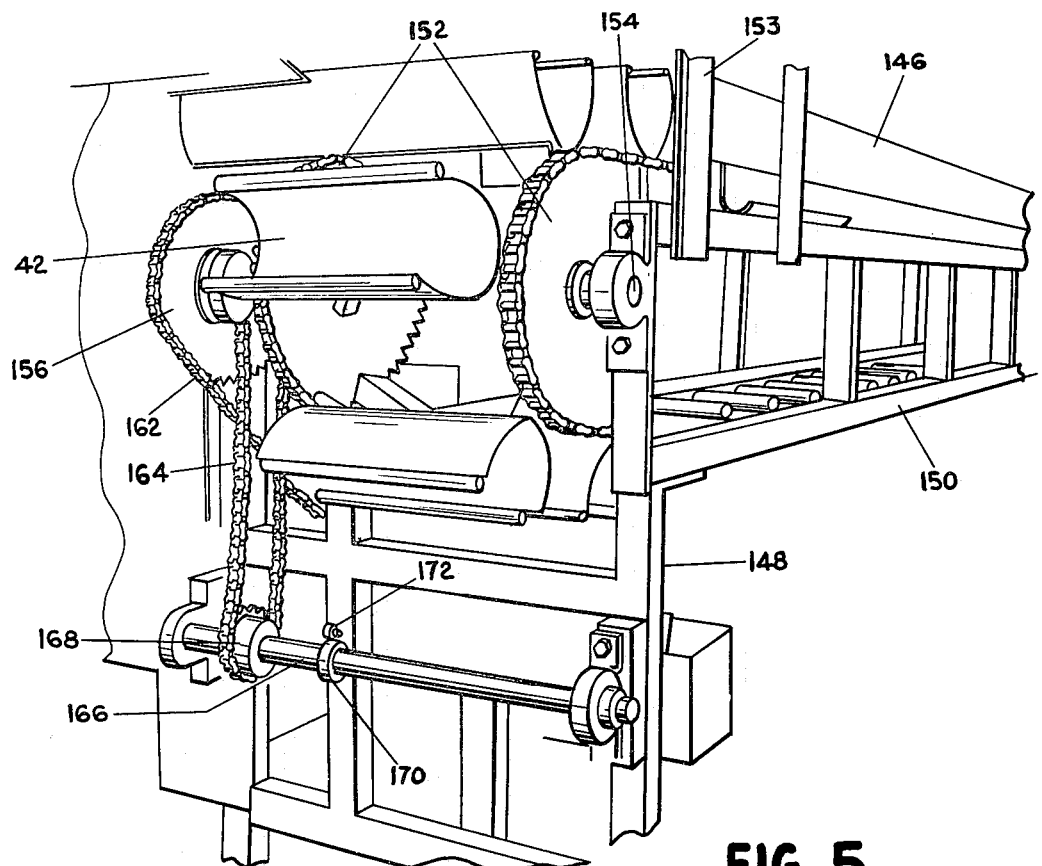
FIG. 5 is a perspective view of a portion of the conveyor illustrating the timing mechanism.

Referring now to the drawings, and to FIG. 1 in particular, there is illustrated an apparatus for feeding articles such as carrots to a bagging operation. For the sake of description of the apparatus, a carrot feeding and bagging operation will be described although it is to be understood that other articles or produce of similar nature can be fed and bagged in accordance with the invention.

Carrots 12 in a hopper 14 are taken therefrom by an elevator 16 and are deposited on a vibratory corrugated tray 18. Carrots 12 are singulated and divided into a plurality of different streams of carrots which are fed to six lanes 20, 22, 24, 26, 28 and 30. Each of the lanes has conveyor belts 32, 34, and 36 which are desirably driven at increasingly faster speeds to provide greater separation and singulation between the carrots fed to each lane. A conveyor belt 36 in each lane feeds the carrots to a weighing and dumping station 38 which collects a predetermined weight of carrots, for example one pound, and then dumps the carrots into a container 42 on a continuous conveyor 40. Each container 42 is secured at either side to continuous chains 44. The containers 42 are moved intermittently in timed relationship beneath each of the weighing and dumping stations 38 and the dumping from each of the weighing and dumping stations 38 is controlled so that the carrots at a given dumping station are dumped into a predetermined container or group of containers. One and only one load of carrots is dumped in each container 42. At an opposite end of the conveyor 40, a bagging apparatus 46 is provided for bagging the carrots. The bagging apparatus 46 can be any suitable bagging apparatus, but preferably is the type of bagging apparatus sold by Formost Packaging Machines, Inc., of Seattle, Wash.. Such an apparatus includes a pusher arm 48 which pushes the carrots from the containers 42 into a bag and carries the bag to a conveyor 50. The bags are then tied with a bag tier 52 as the filled bags move along the conveyor 50.

A diverter mechanism 54 is provided at each of the lanes 20 through 30 at the weighing and dumping stations 38 to divert the carrots on the conveyor belts 36 after a predetermined weight of carrots has been received by the weighing and dumping stations 38 and prior to the time when the carrots are dumped into the containers 42 on the conveyor 40.

Reference is now made to FIG. 2 for a more detailed discussion of the carrot feeding mechanism. The hopper 14 includes a container 56 which is partially filled with water 58. Water is withdrawn from a front bottom portion of the container 56 and pumped through a line 59 to a plurality of discharge nozzles 60 at the back part of the hopper, to cause flow of the water toward the elevator 16. The carrots are thus dumped into the container 56 and are moved by the water flow to the elevator 16.

The elevator 16 comprises a continuous flexible web 62 formed, for example, of open mesh metal material, and having a plurality of transverse projecting wooden cleats 64. The cleats are sufficiently wide to support a single width of carrots transverse to the length of the web 62. A pair of sprockets 66 and 68 support the web 62 for continuous movement in the direction of the arrows. Conventional means (not shown) are provided for driving the sprocket 68 to move the flexible web 62 in the desired direction.

The vibratory corrugated tray 18 is formed from a corrugated plate 70 and is supported by arms 74 and 76 which are driven by a conventional vibratory motor 72. The motor drives the corrugated plate 70 in a vibratory manner to separate the carrots into six paths formed by the various corrugations and to move the carrots down the plate 70 to the conveyor belts 32.

As seen in FIG. 2, conveyor belt 32 is supported by rollers 80 and 82, one of which may be driven by suitable driving means (not shown). Conveyor belt 34 is a continuous web which is supported by rollers 86 and 88, one of which may also be driven by suitable means (not shown). Similarly, the conveyor belt 36 is a continuous web supported by rollers 92 and 94 which are driven by suitable means (not shown). Retaining guides 96 and 98 are provided along the conveyor belts 32, 34, and 36 to retain the carrots thereon as they move down the lanes to the weighing and dumping stations 38.

A carrot return plate 100 is provided beneath the conveyor belt 36 and has upstanding projections 102 which extend into areas between each of the lanes 20 through 30. A return conveyor 104 is provided at the bottom of the carrot return plate 100 to receive the carrots sliding down the plate 100 and to convey them to a second carrot return conveyor 106. The carrots are dumped from the return conveyor 104 onto the return conveyor 106 which moves the carrots to still a third return conveyor 108, which returns the carrots to the hopper 14.

Reference is now made to FIG. 3 for a description of a diverter mechanism. For purposes of simplicity and brevity, only one such diverter mechanism will be described. It is to be understood, however, that each of the lanes 20 through 30 has a similar diverter mechanism which operates in a substantially identical manner.

The diverter mechanism 54 comprises fence 110 which is pivotably supported on a vertical pivot pin 112 alongside of the conveyor belt 36. The fence is movable on pin 112 from a position adjacent to the conveyor belt 36, allowing passage of carrots thereby, to a position across the conveyor belt 36, diverting the carrots to the side into contact with the upstanding projection 102 of the carrot return plate 100. This latter position is illustrated in FIG. 3. An upstanding plate 114 at the upper porion of the fence 100 is pivotably secured to the outer end of an extendible rod 118 of fluid cylinder 116 through a pivotable coupling 120. The cylinder 116 is rigidly supported by the supports 122 on frame members 123. In operation, then fence 110 normally is positioned alongside of the conveyor belt 36 to permit carrots to pass into the weighing and dumping station 38. When the weighing station is full, the extendible rod 118 is extended from the cylinder 116 to rotate the fence 110 about its pivotable mounting 112 across the conveyor belt 36. The carrots passing along the lanes thereafter contact the fence 110 and are diverted to plate 102 which guides the carrots to the conveyor 104.

Figure 4:
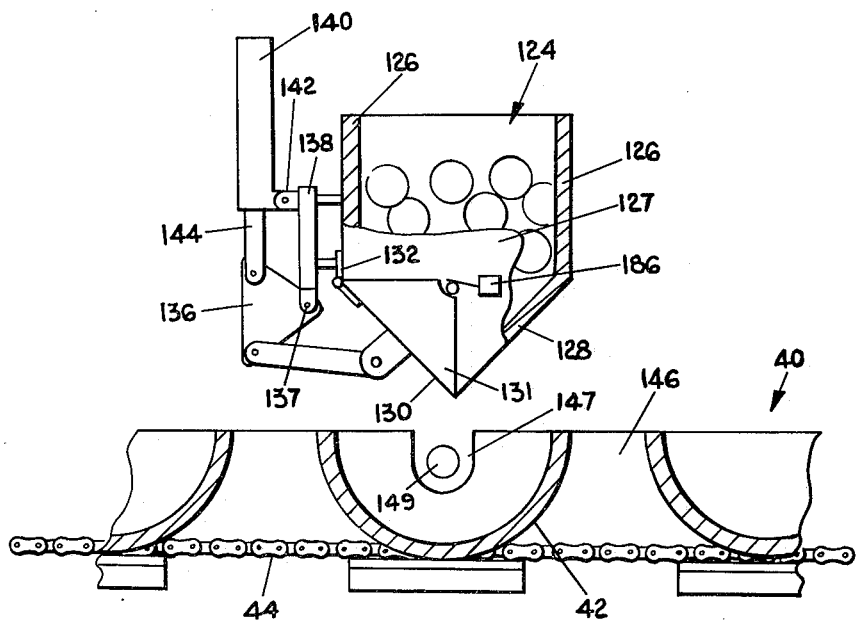
FIG. 4 is a partial sectional view taken along lines 4—4 of FIG. 2 and illustrating the dumping mechanism.

Reference is now made to FIG. 4 for a description of the dumping and loading mechanism. The dumping and weighing stations 38 can be any suitable means to receive and accumulate a plurality of articles, to weigh the same, and to produce an output signal when a predetermined weight of articles is positioned in the accumulator. The apparatus in addition has means for dumping the accumulated articles into containers of conveyor 40. A suitable weighing mechanism is a GR-10 by the Pennsylvania Scale Company.

Reference is now made to FIG. 5 which shows a dumping and weighing station. Typically, each weighing and dumping station 38 includes a weigh hopper 124 comprising vertical side walls 126, inclined bottom walls 128 and 130 and an end wall 127. A hinge 132 secures the bottom wall 130 to the side wall 126. The bottom wall 130 has an angular flange 131 positioned along the end wall 131. A support bracket 138 is secured to the side wall 126 and pivotably mounts one corner of plate 136 on pin 137. A fluid cylinder 140 is pivotably mounted at a bottom portion to the support bracket 138 through a suitable pivot mounting 142 and has an extendible rod 144 pivotably mounted at its end to the other corner of the triangular plate 136. The position of the triangular plate 136 and thus of the inclined bottom wall 130 is controlled by a cylinder 140. When the extendible rod 144 is forced downwardly as illustrated in FIG. 4, the triangular plate 136 retains the bottom wall 130 in its closed position. Retracting of the extendible rod 144 will rotate the plate 136 in a clockwise direction about its pivotable mounting on the support plate 138 and thus rotate the bottom wall 130 about hinge 132 to dump the contents of the hopper 124 into a conveyor container 42 positioned therebeneath.

A normally closed limit switch 186 is mounted on end wall 127 and has an actuator 174 which is positioned for actuation by the edge of flange 131. The switch 186 is thus actuated by rotation of the bottom wall 130 in a clockwise direction to dump the hopper. The switch is thus open when the hopper is closed and closed when the hopper is dumping.

The containers 42 are U-shaped plates which are open at either end for removal of the carrots. A guide fence 146 is positioned along the upper run of the conveyor on each side of the containers 42 between the weighing and dumping stations 48 and the bagger 160 to retain the carrots within the containers 42. However, beneath each of the weighing and dumping stations 48, except the first such station, the fence 146 is cut away at 147. A photocell 149 is positioned adjacent the fence 146 to view through the cut away portion 147 at a light (not shown) at the other side of the containers 42. The light beam to the photocell 149 will be broken when the container is full.

As illustrated in FIGS. 2 and 5, the conveyor 40 is supported by uprights 148 and has elongated side braces 150. Uprights 153 extend upwardly from side braces 150 to support the weighing and dumping stations 38.

The chains 44 of the conveyor 40 are supported on sprockets 152 which are in turn secured to drive shafts 154. The drive shaft 154 is journalled in the uprights 148. The drive shaft 154 is driven intermittently by a Geneva drive 158 through a sprocket 156 on the drive shaft 154, a sprocket 160 on the Geneva drive 158 and a chain 162 which is wound around sprockets 160 and 156. The Geneva drive 158 is powered by the power means (not shown) for the bagger 46 to drive the conveyor intermittently.

Drive shaft 154 drives a chain 164 through a sprocket (not shown) and in turn drives a cam shaft 166 through sprocket 168. A timing cam 170 is positioned on the cam shaft 160. A cam follower 172 is provided for the cams 170. As the conveyor moves, the cam shaft 166 is rotated to operate the cam follower 172. A switch with multiple contacts is connected to the cam follower for a purpose which will be discussed hereinafter.

Reference is now made to FIG. 6 for a description of an electrical circuit used to operate a diverter 54 and a weighing and dumping station 38 in the same lane, it being understood that the same basic circuit (except as noted below) is used to control the feeding from each lane in the feeding mechanism. In FIG. 6, some parts described above are schematically shown with like numerals used to designate like parts.

A common $b+$ line 176 is connected to a common ground line 178 through connector lines 180 and 182. Lines 180 and 182 are connected together in a central portion by electrical line 184. The open line switch 186a and a diverter solenoid 188 are connected in line 180 between the $b+$ common 176 and the common ground 178. A normally open scale switch 190, a normally closed relay switch 190, a dump solenoid 194, a normally open photocell switch 216 and a normally open timing cam switch 218a are connected in line 182 between the $b+$ common 176 and the common ground 178. A normally open limit switch 186b is connected in parallel across the photocell switch 216 and is operative simultaneously with the limit switch 186a. The line 184 is coupled to the connector line 180 between the limit switch 186a and the diverter solenoid 188. At the other end, the line 184 is coupled to the connector line 182 between the scale switch 190 and the relay switch 212. The diverter solenoid 188 operates a valve 196 which supplies fluid pressure to either end of the fluid cylinder 116 for the diverter 154. The dump solenoid 194 operates a valve 198 which controls the flow of fluid pressure to the fluid cylinder 140 for the weigh hopper 124.

Branch line 220 is connected to the electrical line 182 between the relay switch 212 and the dump solenoid 194 at one end and to the common line 178 at the other end. A relay coil 222 is connected in the branch line 220. A third electrical line 206 is provided between the $b+$ line 176 and the common line 178. A relay coil 224 and a normally closed relay switch 226 are connected in series in the electrical line 206. The relay coil 224 operates the normally closed relay switch 212 to open when current flows through line 206. Relay coil 222 opens the normally closed relay switch 226 when current flows through branch line 220.

The foregoing has been a description of the circuit for weighing and dumping stations in the second through sixth position as the conveyor moves (top to bottom in FIG. 1). The circuit for the first weighing and dumping station 38 is the same except that the photocell switch 216 and the limit switch 186b are eliminated. Thus, the first weighing and dumping station will dump at an approximate time whenever the hopper thereof has reached a predetermined weight before the conveyor has stopped. The second through the sixth weighing and dumping stations will discharge only when the containers therebeneath are empty as sensed by the photocells 149, and the hoppers are filled before the conveyor beings its stop cycle.

Operation

In operation, carrots are fed into the hopper 14 and are carried by the elevator 16 to the vibratory corrugated tray 18 and to the lines 20 through 30. The carrots are fed seriatim to each weighing and dumping station 38 where they are received by a weigh hopper 124. As the carrots accumulate in the weigh hopper 124, the weight of the contents are measured by the weighing and dumping station 38. When the contents of the hopper 124 reach a predetermined weight, for example one pound, a signal will be generated by the weighing and dumping station and the switch 190 will close. Current thus flows through switch 190, line 184 and diverter solenoid 188 to the common ground 178. When the current flows through the diverter solenoid 88, the valve 196 is operated to extend the extendible rod 118 for the cylinder 116 and to thereby move the fence 110 across the conveyor 36 for the particular weighing and dumping station 38 in which the proper weight is reached. Thereafter, all carrots passing along the conceyor belt 36 for the full dumping and weighing station are diverted by the fence 110 and are returned to the hopper 14 via carrot return plate 100, return conveyors 104, 106, and 108.

The dumping of the weigh hopper 124 is controlled so that one and only one group of carrots are deposited in one empty conveyor. The first weigh hopper will discharge in a container therebeneath whenever the weigh hopper is full. As the conveyor stops, the timing cam 170 will close the timing cam switches 218a and 218b. Current will then flow through switch 190, 212, dump solenoid 194 and switch 218 (there being no switches 216 and 186b in the circuit for the first weigh hopper). At the same time current will flow through line 220 and through relay coil 222 to open the normally closed switch 226. Current thus does not flow through line 206 and switch 212 remains closed. The valve 196 is actuated by the flow of current through dump solenoid 194 to control the flow of fluid pressure to the fluid cylinder 140 to retract the extendible rod 144. The inclined bottom wall 130 of the weigh hopper 124 is swung open to dump the carrots therein into the container therebeneath.

As the bottom wall 130 is opened, the flange 131 releases the switch actuator 174 to permit the limit switch 186a to close. Current will thereby flow through switch 186a and through solenoid 188 to maintain the valve 196 in its position operating diverter 54. As the hopper dumps, however, the scale switch 190 will be opened to cut off the current flowing therethrough. As the conveyor is moved another increment, the timing cam switch 218a will be deactivated so as to open the switch 218a, thereby de-energizing the dump solenoid 194. Thereafter, the valve 198 is switched to extend the extendible rod 144 of the fluid cylinder 140, thereby closing the bottom wall 130 of the weigh hopper 124. The return of the flange 131 to its initial position will move the switch actuator 174, and thereby open the switch 186a. Current flow through diverter solenoid 188 will thereafter cease and the valve 196 will return to its initial position, thereby returning the fence 110 of the diverter 54 to its initial position. The carrots will then begin to feed once again into the weigh hopper 124 and the cycle begins anew.

In the event that the weigh hopper is no full when the stop cycle begins, the switch 190 will be open. However, the timing cam switches 218a and 218b will close, permitting current to flow through line 206, thereby opening the normally closed switch 212. If the weigh hopper fills during the time the conveyor stops, the switch 190 closes the current flows through line 184, line 180 through diverter solenoid 188 to operate the diverter gate 110. However, due to the presence of the open switch 212, current does not flow through line 182 and through dump solenoid 194. At the end of the cycle, the timing cam switches 218a and 218b again open and switch 212 again closes. At the start of the next cycle, the first hopper will be in condition for dumping. The weigh hoppers are prevented from dumping during a given cycle if the weigh hopper is filled after the conveyor has commenced its stop cycle. This feature of the invention prevents incomplete dumping of a weigh hopper due to an insufficient time cycle for dumping.

The second through the sixth weigh hoppers operate in a manner similar to the first hopper described above. However, an additional condition is imposed on the dumping of these weigh hoppers. The containers beneath these weigh hoppers must be empty before dumping will occur. In the embodiment shown, the presence of an empty container is detected by the photocell 149. This condition causes photocell switch 216 to close to activate the dumping cycle (assuming the particular weigh hopper is full at the start of the cycle). As the hopper dumps, the falling of the carrots into the container may break the light beam, causing the photocell switch 216 to open. However, switch 186b is closed upon opening of the hopper in the same manner as the switch 186a so that the switch 186b latches the circuit in the dump position once the dump cycle commences. Thus, even if the photocell switch 216 should open during the cycle, such opening would not prematurely terminate the dumping operation.

The invention thus provides a system whereby a plurality of containers on a conveyor system can be filled with a minimum weight of material for packaging. Each container on the conveyor is filled to maintain a continuous operation of a bagging apparatus which removes the contents of the containers. Each container is thus filled separately and at a separate time. The feeding mechanism operates so that only a predetermined weight of articles such as carrots are positioned in each of the containers for bagging. The apparatus thus provides a simple and efficient way for continuously feeding a predetermined weight of articles to a bagging operation in a timed sequence.

The invention has been described above with respect to a feeding system which uses three conveyor belts 32, 34, and 36, each driven at a sequentially faster rate. It may be desirable to use more or less belts in feeding the carrots to the weigh hoppers. For example, a single belt can be used to feed the carrots to the weigh hoppers. Desirably, the carrots are fed to the weigh hoppers at a speed of about 250 feet per minute.

Reasonable variation and modification are possible within the foregoing disclosure, the drawings, and the appended claims without departing from the spirit of the invention.

The embodiments of the invention in which an exclusive property or privilege is claimed, are defined as follows:

1. In an apparatus for feeding groups of articles to a packaging operation in a timed continuous sequence, each of said groups having a minimum weight, said apparatus comprising:

a plurality of weighing means, each of said weighing means including a weigh hopper for holding a plurality of said articles, means for weighing articles in said weigh hopper, and means to dump articles from said weigh hoppers;

said weigh hoppers being aligned in a row along a predetermined path;

means for feeding said articles seriatim to each of said weighing means to accumulate a minimum weight of said articles in each of said weigh hoppers;

means for blocking further feeding of said articles to said weighing means after said minimum weight of said articles is present in each of said weigh hoppers;

conveyor means having a plurality of containers adapted to hold and receive a quantity of said articles;

said conveyor means positioning each of said containers for movement along said predetermined path and beneath each of said weighing means for reception of articles dumped from said weigh hoppers;

means for intermittently driving said conveyor means to move containers beneath said weigh hoppers;

the improvement which comprises:

means for controlling each of said dumping means of said weighing means to dump articles in each of said weigh hoppers only in an empty container so that only one group of articles is dumped in each of said containers;

each of said hoppers having means to prevent operation of said dumping means when a predetermined weight has not been attained by said hopper at the time said conveyor stops;

said control means for at least one weighing means comprising circuit means having first switch operated by the weighing means to close when the weight of the articles in the weighing means reaches a predetermined value;

a first actuating means in said circuit to operate said dumping means of the one weighing means;

second switch means in said circuit means adapted to be closed when an empty container is beneath the one weighing means; and said circuit means being adapted to operate said first actuating means when said first and second switch means are closed.

2. An apparatus for feeding groups of articles to a packaging operation according to claim 1 wherein said second switch means is in series with said first switch means and said first actuating means.

3. An apparatus for feeding groups of articles to a packaging operation according to claim 1 and further comprising a photocell positioned beneath said one hopper to sense whether the container beneath said one hopper is empty and means coupling said photocell to said second switch to close said second switch when said container beneath said one hopper is empty; and means to prevent premature termination of the dumping of said weigh hopper due to opening of said second switch after commencement of said dumping.

4. In an apparatus for feeding groups of articles to a packaging operation in a timed continuous sequence, each of said groups having a minimum weight, said apparatus comprising:

a plurality of weighing means, each of said weighing means including a weigh hopper for holding a plurality of said articles, means for weighing articles in said weigh hopper, and means to dump articles from said weigh hoppers;

said weigh hoppers being aligned in a row along a predetermined path;

means for feeding said articles seriatim to each of said weighing means to accumulate a minimum weight of said articles in each of said weigh hoppers;

means for blocking further feeding of said articles to said weighing means after said minimum weight of said articles is present in each of said weigh hoppers;

conveyor means having a plurality of containers adapted to hold and receive a quantity of said articles;

said conveyor means positioning each of said containers for movement along said predetermined path and beneath each of said weighing means for reception of articles dumped from said weigh hoppers;

means for intermittently driving said conveyor means to move containers beneath said weigh hoppers;

the improvement which comprises:

means for controlling each of said dumping means of said weighing means to dump articles in each of said weigh hoppers only in an empty container so that only one group of articles is dumped in each of said containers;

a photocell beneath at least one hopper to sense the presence of an empty container therebeneath, means to actuate dumping of said hopper, if full, responsive to sensing of the empty hopper and means to prevent premature termination of the dumping of said hopper due to detection of articles falling into said container beneath said one weigh hopper at the commencement of the dumping operation.

5. In an apparatus for feeding groups of articles to a packaging operation in a timed continuous sequence, each of said groups having a minimum weight, said apparatus comprising:

a plurality of weighing means, each of said weighing means including a weigh hopper for holding a plurality of said articles in said weigh hopper, and means to dump articles from said weigh hoppers;

said weigh hoppers being aligned in a row along a predetermined path;

means for feeding said articles seriatim to each of said weighing means to accumulate a minimum weight of said articles in each of said weigh hoppers;

means for blocking further feeding of said articles to said weighing means after said minimum weight of said articles is present in each of said weigh hoppers;

conveyor means having a plurality of containers adapted to hold and receive a quantity of said articles;

said conveyor means positioning each of said containers for movement along said predetermined path and beneath each of said weighing means for reception of articles dumped from said weigh hoppers;

means for intermittently driving said conveyor means to move containers beneath said weigh hoppers;

the improvement which comprises:

means for controlling each of said dumping means of said weighing means to dump articles in each of said weigh hoppers only in an empty container so that only one group of articles is dumped in each of said containers;

said control means for at least one of said dumping means, including a circuit, a first switch in said circuit operated by said weighing means to close when a predetermined weight of said articles is reached in one weigh hopper;

a first actuating means in said circuit in series with said first switch to operate said dumping means when current flows through the same; and second switch means in said circuit in series with said first actuating means for closing when an empty container is beneath said one weigh hopper, said circuit being adapted to energize the said first actuating means only when said first and second switch means are closed, whereby said one hopper dumps when said hopper reaches a predetermined weight, and an empty container is therebeneath.

6. An apparatus for feeding groups of articles to a packaging operation according to claim 5 and further comprising: second actuating means in said circuit for operating said blocking means responsive to current flow therethrough, said second actuating means being operatively coupled to said first switch means in series therewith, and in parallel with said second switch means and said second actuating means, whereby said blocking means is operated responsive to closing of said first switch.

7. An apparatus for feeding groups of articles to a packaging operation according to claim 6 and further comprising a third switch means in said circuit and operated to close by dumping of said one hopper, said third switch being in parallel relationship to said first switch and in series relationship with said second actuating means and in series relationship with said first actuating means, whereby said blocking means is operative to block the flow of articles to said one hopper and said dumping means is operative to dump said articles in said one hopper notwithstanding that said first switch may open as dumping of said one hopper commences.

8. An apparatus for feeding groups of articles to a packaging operation according to claim 5 and further comprising third switch means in said circuit and operated to close by dumping of said one hopper, said third switch being in parallel relationship with said first switch and in series relationship with said actuating means and said second switch so that said dumping means is operative to dump said articles in said one hopper notwithstanding that the first switch means opens as dumping of said first hopper commences.

* * * * *